April 17, 1962 W. D. MULLINS, JR 3,029,636
STATIC PRESSURE COMPENSATOR
Filed May 31, 1955 3 Sheets-Sheet 1

INVENTOR.
WILLIAM D. MULLINS, JR.
BY William R. Lane
ATTORNEY

INVENTOR.
WILLIAM D. MULLINS, JR.

United States Patent Office 3,029,636
Patented Apr. 17, 1962

3,029,636
STATIC PRESSURE COMPENSATOR
William D. Mullins, Jr., Downey, Calif., assignor to
North American Aviation, Inc.
Filed May 31, 1955, Ser. No. 512,239
3 Claims. (Cl. 73—178)

This invention relates to pressure compensators and particularly to a device for varying the pressure in a pressure line in a predetermined adjustable manner.

To provide improved flight data information in high speed aircraft it is necessary to eliminate by some means the error in the static pressure data obtained from conventional static pressure detectors. These errors are predominantly due to shock waves and misalignment of the Pitot mast with the average velocity vector. In the past, a long nose boom has been employed in high speed aircraft to place the static pressure source far ahead of the main shock wave. This does not provide complete relief because of the local shock wave from the nose boom itself.

An alternative method of eliminating the error in the static pressure data is to employ a computer which utilizes the total pressure, $P_t$, and the indicated static pressure, $P_{si}$, from a conventional pressure source to generate a signal which is a predetermined function of the error in the static pressure line, $\Delta P_s$, at a particular static pressure and Mach number. The pressure source for the total pressure and indicated static pressure may be a conventional short wing tip boom, body ports, or whatever installation provides the best solution to the structural, aerodynamic and maintenance considerations involved. The signal from this computer is utilized by the apparatus contemplated by this invention to produce a pressure differential in a static pressure line. The direction and magnitude of this pressure differential is such, that if it is added algebraically to the indicated static pressure, the true free stream static pressure is obtained.

It is therefore an object of this invention to provide an apparatus for improving the accuracy of a static pressure line of a high speed aircraft.

A more specific object of this invention is to provide an improved pressure compensator for use in the flight data instrumentation of a high speed aircraft.

It is another object of this invention to provide an apparatus for changing a static fluid pressure by a predetermined adjustable amount.

It is a further object of this invention to provide in a fluid pressure line means for changing the pressure in said line by a predetermined adjustable amount.

It is another object of this invention to provide an apparatus for adjusting the static pressure in a static pressure line utilizing a ring conduit in series with said line, a fluid pump and restrictive orifice in each branch of said ring conduit, said pumps being connected to aid each other in continuously conveying fluid around said ring conduit, and means for varying the pumping rate of at least one of said pumps.

It is another object of this invention to provide means utilizing a variable speed pump and restrictive orifices for varying the pressure in a static pressure line.

Other objects of invention will become apparent from the following description taken in connection with the accompanying drawings, in which.

Figure 1:
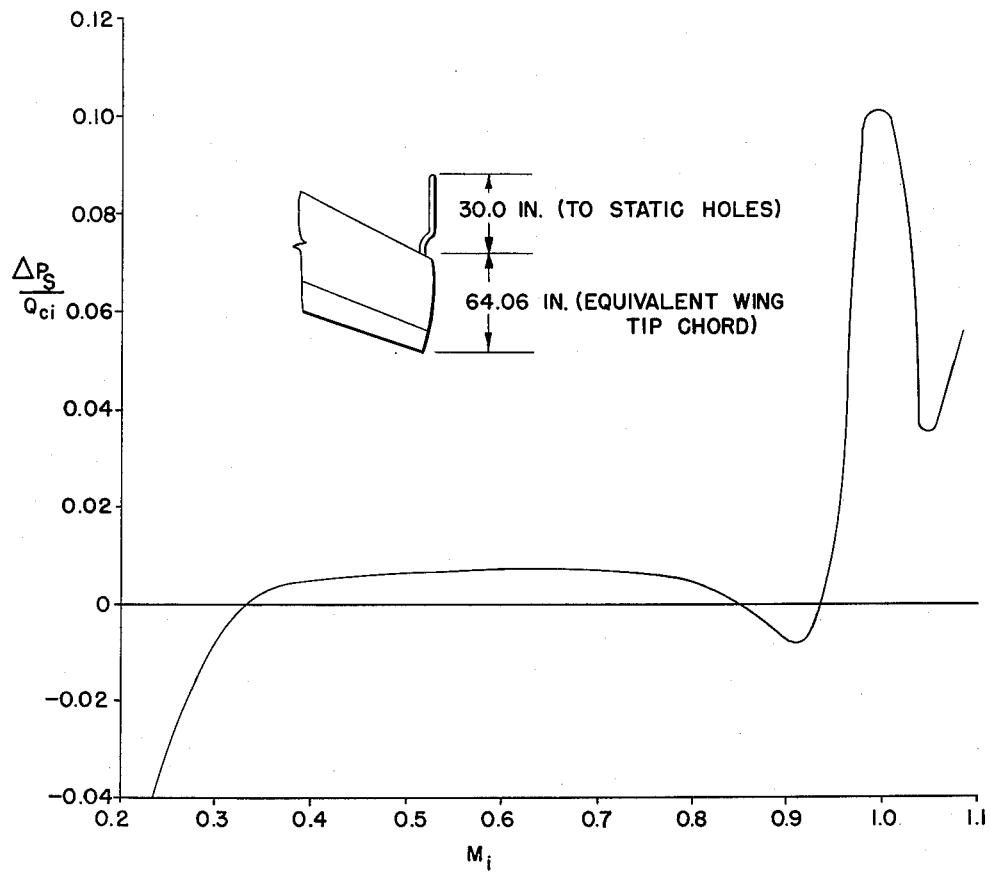
FIG. 1 is a graphic plot of the ratio of the static pressure error, $\Delta P_s$, to the indicated dynamic pressure, $Q_{ci}$, as a function of the indicated Mach number, $M_i$, for a typical wing tip Pitot static head.

Utilizing experimental data, it is possible to accurately plot the ratio of static pressure error, $\Delta P_s$, to indicated dynamic pressure, $Q_{ci}$, as a function of indicated flight Mach number, $M_i$. A typical curve of this function is shown in FIG. 1 for a representative source of static and total pressures. In this example, a short wing tip Pitot static head with the static holes approximately thirty inches in front of the leading edge of the wing was utilized. The data which was utilized to produce this plot was obtained partially from flight test and partially from experimental data resulting from high speed flight tests on a research aircraft and from wind tunnel data. The procedures used to obtain the data are well-known to those skilled in the art and need not be further described here.

The following is a theoretical analysis of the computer utilized by the preferred embodiment of this invention to produce a signal output which is a predetermined function of the static pressure error, $\Delta P_s$. This computer utilizes, as inputs, signals which are functions of the indicated static pressure, $P_{si}$, and the total pressure, $P_t$. Referring to FIG. 1, it is possible to express the equation of the curve mathematically as $$\frac{\Delta P_s}{Q_{ci}} = f_1(M_i) \tag{1}$$

where $\Delta P_s$ is the error of static pressure, $Q_{ci}$ is the indicated dynamic pressure and $M_i$ is the indicated Mach number. By definition, $$\Delta P_s = P_{si} - P_s \tag{2}$$

where $P_{si}$ is the indicated static pressure and $P_s$ is the true free stream static pressure. The indicated dynamic pressure, $Q_{ci}$, is $$Q_{ci} = P_t - P_{si} \tag{3}$$

where $P_t$ is the total pressure from the Pitot tube, while the indicated Mach number, $M_i$, is $$M_i = f_2(P_t, P_{si}) \tag{4}$$

Substituting Equations 3 and 4 in Equation 1 and simplifying $$\Delta P_s = [P_t - P_{si}] f_3(P_t, P_{si}) \tag{5}$$

Conventional computer systems well-known to those skilled in the art can be utilized to convert pressures $P_t$ and $P_{si}$ into pressure differential $\Delta P_s$ in accordance with Equation 5 and the functions graphically presented in FIG. 1.

Figure 2:
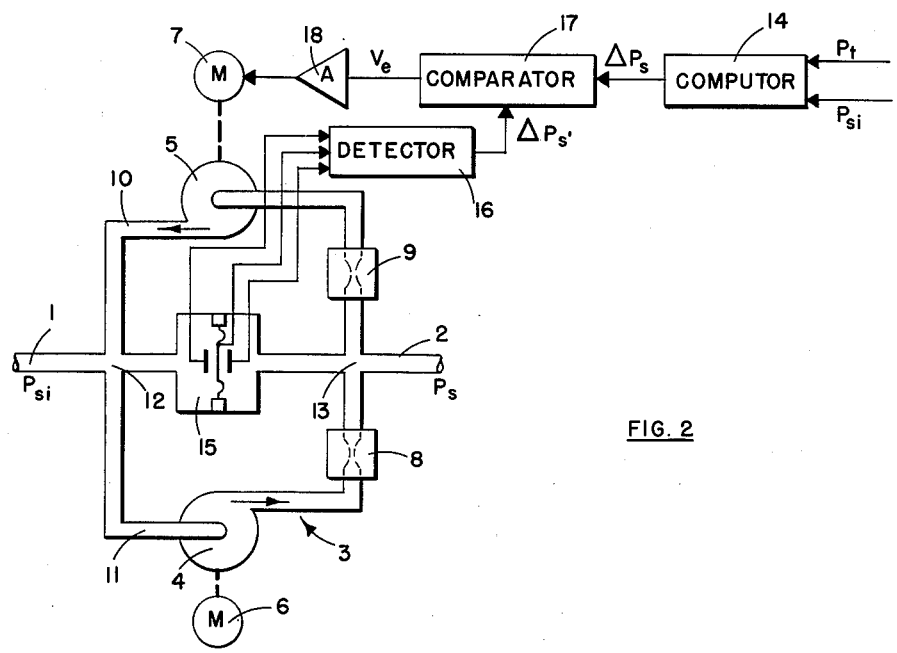
FIG. 2 is a block diagram, partly schematic, of a preferred embodiment of the static pressure compensator contemplated by this invention.

The output signal from this computer is utilized by the preferred embodiment of this invention in the manner shown in FIG. 2 to convert indicated static pressure into true free stream static pressure. It is to be noted, as shown in Equation 2 above, that the algebraic sum of indicated static pressure and the static pressure error is equivalent to the true free stream static pressure. This algebraic addition is accomplished by utilizing the apparatus of this invention in the static pressure line between the source of indicated static pressure and the aircraft instrumentations.

Referring now to FIG. 2, a schematic drawing of a preferred embodiment of the static pressure compensator contemplated by this invention is shown. Tube 1 is a part of the static pressure line of the aircraft and is connected to the indicated static pressure source such as the wing tip boom, previously described. Tube 2 is on the output side of pressure compensator or adjustor 3 and is connected to the instruments in the aircraft which are to be sensitive to true free stream static pressure. It is the purpose of pressure compensator or adjuster 3 to correct the static pressure line for errors in the indicated static pressure in tube 1 caused by the shock wave in front of the aircraft at supersonic speeds and for misalignment of the Pitot tube. Adjuster 3 achieves the function of transmitting to the output duct 2 the indicated static pressure in tube 1 as modified by an adjustable pressure increment. Thus, the adjuster 3 simply adds or subtracts to the indicated static pressure which is transmitted to the output or utilization line 2, a pressure increment determined by the computed errors of the indicated static pressure. Pressure compensator 3 utilizes a closed ring conduit having branches 10 and 11. Each branch has at least one blower or pump and a restrictive orifice. A small amount of air is continuously circulating around the closed ring conduit. It is to be noted that the air in tubes 1 and 2 is preferably in a static condition, that is, there is normally no air flow in either tube 1 or tube 2.

Positioned in the ring conduit of pressure compensator 3 are linear blowers 4 and 5 which are driven by motors 6 and 7, respectively. Also positioned in the ring conduit are restrictive orifices 8 and 9. Blowers 4 and 5 are connected in a manner to aid each other in circulating air about the closed ring. The pressure differential between the inlet ports of blowers 4 and 5 and the corresponding outlet ports is a function of the speed of rotation of the rotors of the respective blowers. If both blowers 4 and 5 are constructed substantially identical and their rotors are rotated at the same angular velocity, the pressure differentials generated by the blowers are identical. Restrictive orifices 8 and 9 in ring branches 11 and 10, respectively, of the ring conduit are also preferably constructed to have substantially equal resistance to the flow of the recirculating air. Branches 10 and 11 therefore are normally in balance.

In the above example, with the rotors of blowers 4 and 5 rotating at substantially the same angular velocity, and with branches 10 and 11 in balance, there is no pressure drop between junctions 12 and 13 of the ring conduit. For example, neglecting the negligible pressure drops in the rest of the conduit, the pressure drop across restrictive orifice 9 is substantially equal to the pressure differential generated by blower 5. Similarly, the pressure drop across restrictive orifice 8 is substantially equivalent to the pressure differential generated by blower 4. Therefore, junction 13 is subjected to the same fluid pressure as junction 12. In FIG. 2, blower 4 is driven by constant speed motor 6 while blower 5 is driven by an adjustable speed motor 7. Motor 6 is energized from a source (not shown) of constant D.-C. voltage. The circuit utilized to energize motor 7 is described later with respect to FIG. 4.

It is to be noted that if blower 5 is rotated at a slightly higher angular velocity than blower 4, branches 10 and 11 of the pressure compensator 3 are unbalanced. This is apparent from an analysis of the pressure drops across orifices 8 and 9 and the pressure differentials generated by blowers 4 and 5. While the pressure drops across orifices 8 and 9 remain identical, since both are subjected to the same rate of flow, the pressure differential generated by blower 5 is greater than that generated by blower 4. This results in an increase in pressure at junction 12 with respect to that at junction 13. The pressure differential, $\Delta P_s'$, between junctions 12 and 13 is thus a function of the relative angular velocities of the rotors of blowers 4 and 5. By controlling the speed of rotation of at least one of the blowers in a predetermined manner, the pressure differential between junctions 12 and 13 is regulated over a substantial range. It is to be further noted that, if the rotor of blower 5 is rotating at a lower speed than the rotor of blower 4, a similar pressure differential occurs between junctions 12 and 13 but of an opposite polarity.

Various means for controlling the pumping rates of one or both of blowers 4 and 5 can be devised. In the preferred embodiment shown in FIG. 2, the speed of rotation of the rotor of blower 5 is regulated by an electric signal from computer 14. As previously described, computer 14 is responsive to the total pressure and the indicated static pressure. Computer 14 converts this total pressure and indicated static pressure in accordance with the predetermined plot of pressure error versus Mach number, previously described, into an electric signal proportional to the static pressure error, $\Delta P_s$.

In order to increase the reliability of the pressure compensator a closed loop servo system is incorporated which utilizes pressure sensitive, capacitive pickoff 15 and detector 16 for generating an electric signal which is a predetermined function of the pressure differential, $\Delta P_s'$, between junctions 12 and 13 of the ring conduit. The signal from detector 16 is compared with the output signal, $\Delta P_s$, from computer 14 in comparator 17. A signal proportional to the difference between these two inputs is produced by comparator 17 and amplified by amplifier 18. This amplified signal is utilized to drive motor 7 to maintain the pressure differential between junctions 12 and 13 at a value substantially equal to the calculated static pressure error, $\Delta P_s$. As long as the indicated static pressure and total pressure remain constant, pressure compensator 3 generates a constant pressure differential between junctions 12 and 13. If either the indicated static pressure $P_{si}$ or the total pressure $P_t$ is changed, such as in response to a change in altitude or change in velocity of the aircraft, the output of computer 14 changes thereby unbalancing comparator 17 which in turn causes a change in the angular velocity of the rotor of blower 5. As previously pointed out, any change in this angular velocity causes a corresponding change in the pressure differential between junctions 12 and 13 of the ring.

Figure 4:
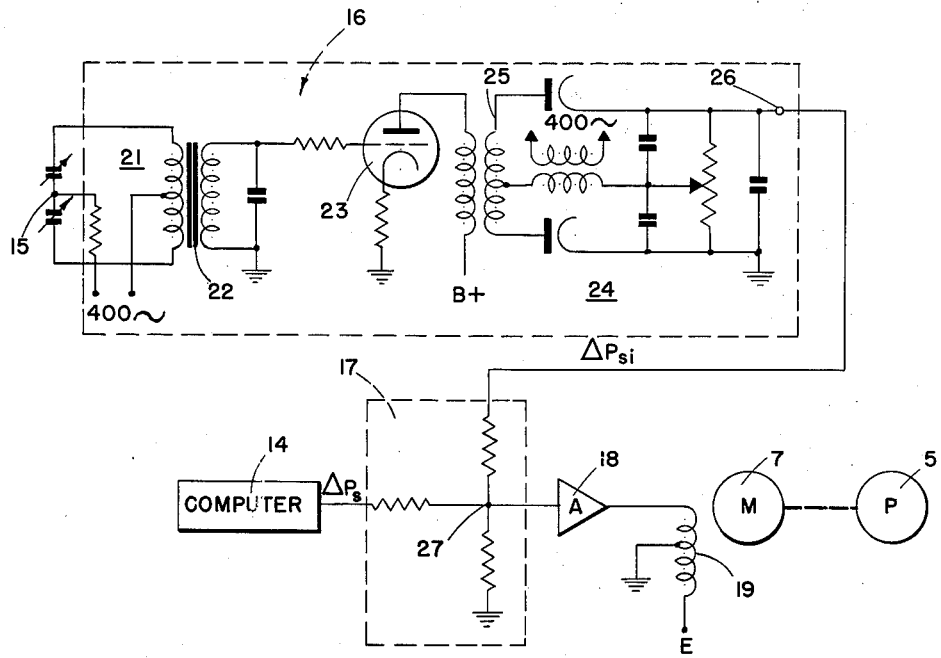
FIG. 4 is a schematic drawing of an electronic circuit utilized with the static pressure compensator shown in FIG. 2.

Referring now to FIG. 4, a schematic drawing of an electronic circuit utilized to actuate motor 7 of FIG. 2 is shown. Capacitive pickoff 15 is normally maintained in a balanced condition. When there is a pressure differential between junctions 12 and 13 in FIG. 2, the diaphragm of capacitive pickoff 15 moves in a direction determined by the sign of the pressure differential. The magnitude of movement of the diaphragm is determined by the magnitude of the pressure differential. The movement of this diaphragm unbalances capacitive pickoff 15 which in turn unbalances bridge 21 of detector 16 thereby generating a signal across the secondary winding of transformer 22. The magnitude of this signal is proportional to the magnitude of unbalance of capacitive pickoff 15 and the phase of this signal is determined by the direction of movement of the diaphragm of capacitive pickoff 15. The signal across the secondary winding of transformer 22 is amplified by amplifier 23 and inductively coupled into phase detector 24. Phase detector 24 generates a D.-C. potential on terminal 26, the polarity of which is determined by the phase of the input signal across winding 25 and the magnitude of which is determined by the magnitude of the input signal. The voltage of terminal 26 is therefore a predetermined function of the pressure differential between junctions 12 and 13 of pressure compensator 3.

Computer 14 is sensitive to the total pressure and the indicated static pressure and generates, for a particular configuration of pressure ports, an accurate indication of the error in static pressure, $\Delta P_s$. Computer 14 is designed to take into consideration the variation of the error in static pressure for different Mach numbers and indicated static pressures. The signal output from computer 14 is therefore a D.-C. potential which is a predetermined function of the error in static pressure, $\Delta P_s$. The D.-C. signal outputs from detector 16 and computer 14 are compared by comparator 17. For a given actual and computed pressure differential, the signal from detector 16 is designed to have a different polarity from the signal from computer 14. Comparator 17 is essentially a summing network which produces a voltage at terminal 27 which is equivalent to the algebraic sum of the two input signals. As long as the signal from detector 16 indicates that the pressure differential between junctions 12 and 13 is exactly equivalent to the desired pressure differential as computed by computer 14, terminal 27 is at ground potential. If there is a change in the computed pressure differential from computer 14, comparator network 17 is unbalanced and impresses a voltage on terminal 27 which is amplified by amplifier 18. The output from amplifier 18 changes the field strength of motor 7 in a direction to accomplish a correction of the pressure differential between junctions 12 and 13 in the desired direction and magnitude. It is noted that the lower portion of winding 19 of motor 7 is continuously subjected to a constant D.-C. potential from a source (not shown). As previously stated, when there is no signal from the capacitor 15 or computer 14, it is desired that motor 7 drive blower 5 at substantially the same angular velocity as motor 6 is driving blower 4. This constant potential applied to winding 19 is designed to actuate motor 7 such that equal angular velocities are attained during periods of zero input signal from amplifier 18.

As a result of the apparatus shown in FIGS. 2 and 4 a pressure differential is maintained between junctions 12 and 13 which is substantially equivalent to the pressure differential which is necessary to accurately compensate for errors in the indicated static pressure in line 1 as computed by computer 14. Therefore, the pressure maintained in line 2 and coupled to the aircraft instrumentation is an accurate measure of the true free stream static air pressure in the vicinity of the aircraft.

Figure 3:
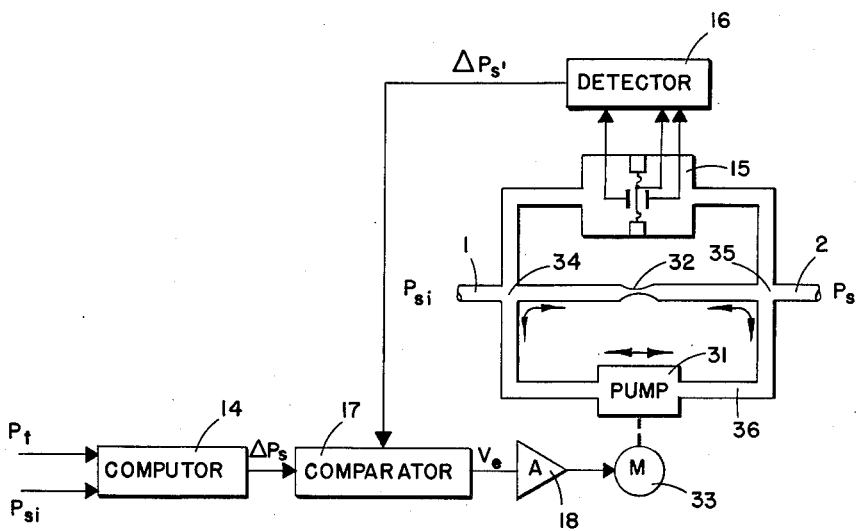
FIG. 3 is a block diagram, partly schematic, of an alternative static pressure compensator.

Referring now to FIG. 3 an alternative embodiment of the static pressure compensator contemplated by this invention is shown. In this embodiment a single blower, 31, is utilized. Line 1 is again connected to a convenient but inaccurate source of indicated static pressure. Line 2 is again attached to the static pressure line of the aircraft instrumentation. Positioned between lines 1 and 2 is restrictive orifice 32. Pump 31 is preferably a reversible constant displacement pump such as a conventional gear pump or moving-vane pump. The pressure ports of pump 31 are connected to the static pressure line on each side of restrictive orifice 32. Motor 33 is a reversible D.-C. motor connected to drive blower 31 at a speed and in a direction depending upon the magnitude and polarity of an electric input signal. Pickoff 15 is again sensitive to the pressure differential between lines 1 and 2. Pickoff 15, detector 16, computer 14, comparator 17, and amplifier 18 are constructed similar to that previously described with respect to FIG. 2. Therefore, the output voltage from amplifier 18 is proportional to the deviation of the pressure differential between junctions 34 and 35 from the computed pressure differential from computer 14. It is to be noted that as blower 31 circulates air about closed ring 36 substantially all of the pressure drop in the ring occurs across restrictive orifice 32. This pressure drop is regulated, by the circuit previously described, to be substantially equivalent to the error in the static pressure.

Figure 5:
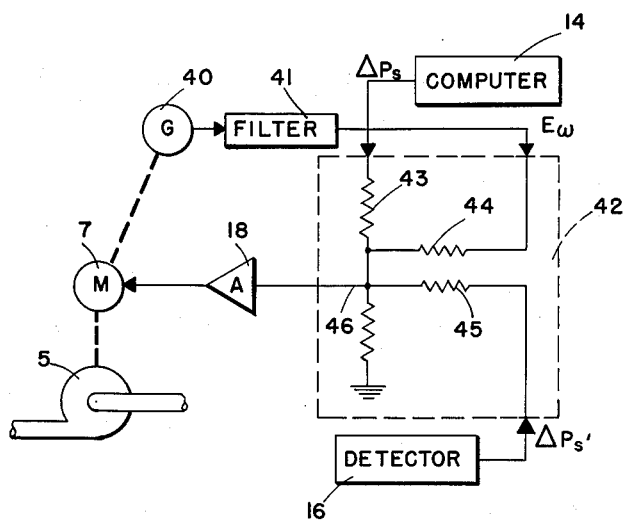
FIG. 5 is a schematic drawing of a modification of the pressure compensator of FIG. 2.

Referring now to FIG. 5, a modification of the pressure compensator of FIG. 2 is shown. In the apparatus of FIG. 2, there is a tendency for the pressure compensator 3 to hunt about the proper pressure differential between junctions 12 and 13. This is due to the large time lag between a change of signal, $\Delta P_s$, from computer 4 and the creation, measurement and conversion of the pressure differential between junctions 12 and 13 into detector signal $\Delta P_s'$. This effect of the long response time is decreased a considerable amount by the addition of the modification shown in FIG. 5. Rate generator 40 is mechanically coupled to variable speed motor 7 and produces an electric signal output which is a predetermined function of the angular velocity of motor 7. The electric signal output from rate generator 40 is filtered by filter 41 producing a D.-C. potential $E\omega$, which is a function of the angular velocity of the rotor of pump 5. As previously noted, this angular velocity is also a measure of the pressure differential between junctions 12 and 13 after a condition of equilibrium has been attained by the system.

The signal from rate generator 40 is coupled into comparator 42 where it is combined with the signal, $\Delta P_s'$, from detector 16 and compared to the signal $\Delta P_s$, from computer 14. The values of resistors 43, 44 and 45 are selected in accordance with well-known summing network theory to normally maintain terminal 46 substantially at ground potential when the pressure differential between junctions 12 and 13 is at the desired value computed by computer 14. It is readily apparent that rate generator 40 has a much faster response time to variations in the signal from computer 14 than is attained by utilizing the signal from detector 16 alone.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A static pressure adjustor for generating a static air pressure which varies by a predetermined adjustable amount from the pressure from a source of static air pressure comprising a duct, one end of which is subjected to the air pressure of said static pressure source and the other end of which comprises an output port, a portion of said duct between said ends being split into two parallel branches interconnected at their respective ends to form a closed ring, a restrictive orifice in each of said branches, a blower in each of said branches, said blowers being connected to aid each other in recirculating air around the closed ring formed by said two branches, at least one of said blowers having an adjustable pumping rate, and means for adjusting in a predetermined manner the pumping rate of said adjustable blower whereby a static pressure differential of predetermined magnitude is generated between the ends of said duct.

2. The adjustor of claim 1 wherein said pumping rate adjusting means includes means for generating fixed and variable signal components and a blower drive responsive to both said components, the other of said blowers having a fixed pumping rate, said fixed signal component having a magnitude sufficient to cause the pumping rate of said one blower to be equal to that of said other blower.

3. An adjustable fluid pressure transmission system comprising an input duct adapted to be subjected to fluid pressure from a pressure source, an output duct adapted to be connected with a pressure utilization device, and means for transmitting to said output duct and pressure in said input duct as modified by an adjustable pressure increment, said means comprising a closed loop conduit having a restrictive orifice in one portion thereof, said conduit portion having ends thereof on respectively opposite sides of said orifice connected in fluid communication with said input and output ducts respectively, and adjustable pressure source interposed in said one portion of said closed loop conduit for recirculating fluid around said closed loop conduit to effect an adjustable pressure increment across said orifice, means for controlling said pressure source to control the magnitude and sense of said increment, said closed loop conduit including a second conduit portion having a second restrictive orifice therein and having the ends thereof connected in fluid communication with said respective ends of said one portion and said input and output ducts respectively, and a fixed pressure source interposed in said second conduit portion.

References Cited in the file of this patent

UNITED STATES PATENTS

| | | |
|---|---|---|
| 753,563 | Myers | Aug. 4, 1903 |
| 1,190,044 | Thomson | July 4, 1916 |
| 1,306,000 | Fulton | June 10, 1919 |
| 1,910,202 | Crago | May 23, 1933 |
| 2,047,285 | Needham | July 14, 1936 |
| 2,439,239 | Crever | Apr. 6, 1948 |
| 2,551,470 | Smith | May 1, 1951 |
| 2,669,873 | Gardner | Feb. 23, 1954 |
| 2,703,013 | Wildhack | Mar. 1, 1955 |
| 2,814,198 | Howland | Nov. 26, 1957 |

FOREIGN PATENTS

| | | |
|---|---|---|
| 356,945 | Great Britain | Sept. 17, 1931 |
| 641,047 | Germany | Jan. 22, 1937 |